US009460435B2

(12) United States Patent
Hu et al.

(10) Patent No.: US 9,460,435 B2
(45) Date of Patent: Oct. 4, 2016

(54) ADVANCING A COMMITTED TRANSACTION TIME

(75) Inventors: Chunyan Hu, Kowloon (HK); Shek Duncan Wong, Kowloon (HK); Xiaotie Deng, Hong Kong (HK); Qiong Huang, Kowloon (HK); Guomin Yang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 1089 days.

(21) Appl. No.: 12/428,386

(22) Filed: Apr. 22, 2009

(65) Prior Publication Data

US 2009/0276361 A1    Nov. 5, 2009

Related U.S. Application Data (60) Provisional application No. 61/047,236, filed on Apr. 23, 2008.

(51) Int. Cl.
| | |
|---|---|
| G06Q 20/00 | (2012.01) |
| G06Q 20/40 | (2012.01) |
| G06Q 20/02 | (2012.01) |
| G06Q 20/12 | (2012.01) |
| G06Q 20/38 | (2012.01) |
| H04L 9/32 | (2006.01) |

(52) U.S. Cl.
CPC ............ *G06Q 20/40* (2013.01); *G06Q 20/02* (2013.01); *G06Q 20/12* (2013.01); *G06Q 20/382* (2013.01); *G06Q 20/385* (2013.01); *G06Q 20/3825* (2013.01); *H04L 9/3218* (2013.01); *H04L 9/3247* (2013.01); *H04L 9/3297* (2013.01); *H04L 2209/56* (2013.01)

(58) Field of Classification Search
CPC .................................................... G06Q 20/401
USPC ...................................................... 705/64, 75
See application file for complete search history.

(56) References Cited

U.S. PATENT DOCUMENTS

| | | | |
|---|---|---|---|
| 6,603,857 B1 * | 8/2003 | Batten-Carew et al. | 380/44 |
| 7,321,660 B2 * | 1/2008 | Mont et al. | 380/277 |
| 7,436,989 B2 * | 10/2008 | Chung et al. | 382/119 |
| 7,451,116 B2 * | 11/2008 | Parmelee et al. | 705/50 |
| 7,483,699 B2 * | 1/2009 | Karmi et al. | 455/432.2 |
| 8,024,274 B2 * | 9/2011 | Parkes et al. | 705/64 |
| 8,526,621 B2 * | 9/2013 | Rabin et al. | 380/282 |

(Continued)

OTHER PUBLICATIONS

Yevgeniy Dodis et al., Time Capsule Signature, Mar. 2005, pp. 1-19.*

(Continued)

*Primary Examiner* — Alexis Casey
(74) *Attorney, Agent, or Firm* — Amin, Turocy & Watson, LLP (57) ABSTRACT

Transaction systems and methods for advancing a committed time in the future are described herein. In the present transaction systems and methods, the first end can be permitted to pre-hatch a time capsule signature before the committed time. The time capsule signature scheme here is conducted based on an identity-based trapdoor relation (IDTR). Moreover, an extended time capsule signature scheme is conducted based on an extended identity-based trapdoor relation (IDTR). By using an extended IDTR primitive, the present transaction systems and methods can distinguish the time capsule signature is validated before or after the committed time t.

20 Claims, 4 Drawing Sheets

(56) References Cited

U.S. PATENT DOCUMENTS

2009/0049534 A1* 2/2009 Chung .............................. 726/7
2010/0185863 A1* 7/2010 Rabin et al. .................. 713/171

OTHER PUBLICATIONS

Asokan, et al., "Optimistic fair exchange of digital signatures." IEEE Journal on Selected Areas in Communications, 18(4):593-610, 2000, 16 pages.

Bellare, et al., "Encapsulated key escrow." Technical Report 688, MIT/LCS/TR, 1996, 28 pages.

Bellare, et al., "Verifiable partial key escrow." In ACM Conference on Computer and Communications Security, pp. 78-91, 1997, 22 pages.

Bellare, et al., "Random oracles are practical: a paradigm for designing efficient protocols." In ACM Conference on Computer and Communications Security, pp. 62-73, 1993.

I. F. Blake and A. C.-F. Chan. Scalable, server-passive, user-anonymous timed release public key encryption from bilinear pairing. In ICDCS, 2005.

Boneh, et al., "Efficient selective-id secure identity based encryption without random oracles." In Proc. EUROCRYPT 2004. Springer-Verlag, 2004. LNCS, 15 pages.

Boneh, et al., "Identity-based encryption from the Weil pairing." In Proc. CRYPTO 2001, pp. 213-229. Springer-Verlag, 2001. LNCS 2139, 27 pages.

Boneh, et al., Aggregate and verifiably encrypted signatures from bilinear maps. In Eurocrypt'03, pp. 416-432. Spinger, 2003. LNCS, 19 pages.

Boneh, et al., "Timed commitments." In Proc. CRYPTO 2000, p. 236. Springer-Verlag, 2000. LNCS 1880.

Chen, et a., "Applications of multiple trust authorities in pairing based cryptosystems." In Infrastructure Security Conference 2002, pp. 260-275. Spinger-Verlag, 2002. LNCS 2437, 16 pages.

Cheon, et al., "Timed-release and key-insulated public key encryption." Cryptology ePrint Archive, Report 2004/231, 2004, 28 pages.

Yodis, et al., "Breaking and repairing optimistic fair exchange from PODC 2003." In ACM Workshop on Digital Rights Management (DRM), Oct. 2003, 13 pages.

Dodis, et al., "Time capsule signature." In Financial Cryptography and Data Security 2005, pp. 57-71. Springer-Verlag, 2005. LNCS 3570, 19 pages.

Garay, et al., "Timed release of standard digital signatures." In Financial Cryptography and Data Security 2002, pp. 168-182. Spinger-Verlag, 2002. LNCS 2357, 13 pages.

Garay, et al., "Timed fair exchange of standard signatures." In Financial Cryptography and Data Security 2003, pp. 190-207. Springer-Verlag, 2003. LNCS 2742, 15 pages.

Goldwasser, et al., "A digital signature scheme secure against adaptive chosen-message attack." SIAM J. Computing, 17(2):281-308, Apr. 1988, 26 pages.

T. C. May. Timed-release crypto, 1993. www.cyphernet.org/cyphernomicon/chapter14/14.5.html.

M. C. Mont, K. Harrison, and M. Sadler. The HP time vault service: Exploiting IBE for timed release of confidential information. In WWW, 2003.

Rivest, et al., "How to leak a secret." In Asiacrypt01, pp. 552-565. Spinger-Verlag, 2001. LNCS /2248, 14 pages.

Rivest, et al., "Time-lock puzzles and timed-release crypto." Technical Report 684, MIT/LCS/TR, 1996, 9 pages.

Shamir, "Identity-based cryptosystems and signature schemes." In Proc. CRYPTO 84, pp. 47-53. Springer, 1984. LNCS 196, 7 pages.

Waters, "Efficient identity-based encryption without random oracles." In Proc. EUROCRYPT 2005, pp. 114-127. Springer-Verlag, 2005. LNCS 3494, 13 pages.

M. Zhang, G. Chen, J. Li, L. Wang, and H. Qian. A new construction of time capsule signature. Cryptology ePrint Archive, Report 2006/113, 2006. http://eprint.iacr.org.

* cited by examiner

The time server sets a first public key and a first secret key; the first end sets a second public key and a second secret key. — 215

The first end generates a time capsule signature on a message $m$ for a committed time $t$ and a sampled witness value $d$ — 225

The second end checks if the time capsule signature is a valid time capsule signature. — 235

The first end generates a pre-hatched signature — 245

The second end checks the validity of the pre-hatched signature and validates the message $m$ before the committed time $t$ — 255

ADVANCING A COMMITTED TRANSACTION TIME

CROSS-REFERENCE TO RELATED APPLICATIONS

This application is based upon and claims the benefit of priority from the prior U.S. provisional application 61/047,236, filed Apr. 23, 2008, the entire contents of which are incorporated herein by reference.

BACKGROUND

In the conventional signature scheme used in the E-commerce transaction, the validity of a signature value is determined at the point of signature generation and never changes. Signers cannot generate the so-called 'future signature' which is not currently valid but becomes valid from a future time t.

A naive way to achieve this is signing with a statement such as "the signature of message m becomes valid from the future time t." This, however, has several drawbacks. First, and least serious, the verifier is required to be aware of the current time. When time is generalized to arbitrary events (i.e., 'the signature of message m becomes valid if the event e happens'), this becomes even more problematic. More seriously, however, in the naive solution the signer loses control over the validity of the future signature, i.e. even the real signer cannot make the signature valid before the time t. This means the signer has to wait until time t. It could be undesirable in certain situations. For example, in the case of debt repayment, after a borrower signed a check to indicate the repayment day (e.g. due day), he may have the desire to repay his debt earlier to improve his credit history.

Alternatively, the signer can issue a new, independent signature of message m before time t. This solution, however, can also be undesirable in certain situations. For example, in case the message m carries some monetary value, the first end needs to make sure that no "double spending" occurs (i.e., to somehow revoke the original signature, so that it does not become valid at time t).

Therefore, it is necessary to figure out a solution where the signer can issue a future signature so that at least the following properties are satisfied:

(1) At the time of creation, the verifier is sure that the signature will become valid by time t, even if the signer refuses to cooperate after she produces the future signature.
(2) The legal signer can make the future signature valid at any time after the initial creation.

To realize these properties in E-Commerce platforms, a new primitive, which has a great promise to be a very useful tool, is called Time Capsule Signature.

A time capsule signature involves a first end (such as a signer), a second end (such as a verifier) and a time server. The first end can issue a future signature indicated by a committed time t, and enjoys the following properties: first, the second end can verify immediately that the signature will become valid at time t; secondly, the signature will automatically become valid at the committed time t, even without the cooperation of the first end; and moreover, the first end has a privilege to make the signature valid before time t. The action of validating the signature before the time t is known as pre-hatch, as opposed to hatch the signature at time t when some additional information is published by the time server.

Moreover, in some scenarios, it is needful to distinguish a pre-hatched signature from a hatched signature. In the above debt repayment case, a pre-hatched signature has to be identified when a signer intentionally pre-hatches the signature for increasing his credit history. On the other hand, under the property of indistinguishability of the conventional signature scheme, the time server has to be fully trusted, otherwise, there is no way to tell if a signature which becomes valid before time t is generated by the actual signer or a cheating time server.

It is therefore desirable to have systems and methods for advancing the committed time t based on the willing of the first end. Meanwhile, the systems and methods can distinguish a pre-hatched signature from a hatched signature.

SUMMARY

The subject innovation provides a transaction system and a transaction method for advancing a committed time in the future. Currently used techniques that model transaction actions in an E-commerce platform limit the variety of E-Commerce because a first end loses control of the committed time t once a signature is produced. Further, current E-commerce transaction techniques prevent the first end from validating the signature before the committed time t.

Compared to the current E-commerce transaction technology, the novel systems and methods of the claimed subject matter provide the possibility of realizing various transactions in E-commerce. Unlike the conventional E-commerce transaction technology, the variety of E-commerce is provided because the first end has a power to validate the signature before the committed time t. In addition, the systems and methods of the subject innovation can distinguish if the signature is hatched or pre-hatched.

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The subject innovation provides an improved transaction system and method for providing variety of E-commerce. In accordance with one aspect of the disclosed subject matter, an transaction system provides variety of E-Commerce, which comprises: a first end coupled to open distributed information network or Internet for conducting electronic transaction; a second end coupled to the Internet for verifying the electronic transaction; an time server coupled to the network for arbitrating the electronic transaction between the first end and the second end. The first end can generate a time capsule signature on a message for a committed time and a sampled witness value based on the committed time. The first end can generate a pre-hatched signature by combining or relating the time capsule signature and the sampled witness value. The second end can validate the pre-hatched signature at a validated time before the committed time.

In accordance with another aspect of the disclosed subject matter, the transaction system and method further can identify whether the time capsule signature is hatched or pre-hatched. It means that the transaction system and method can distinguish the time signature is validated before or after the committed time t.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of systems and methods for advancing a committed time in E-commerce transaction are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

The subject invention relates to transaction systems and methods for providing variety of E-commerce by advancing a committed time. To this end, embodiments of the invention include techniques for permitting a first end to validate the time capsule signature before the committed time. Further, embodiments of the invention include techniques for maintaining the security in the E-commerce transaction while the first end advances the committed time.

Figure 1:
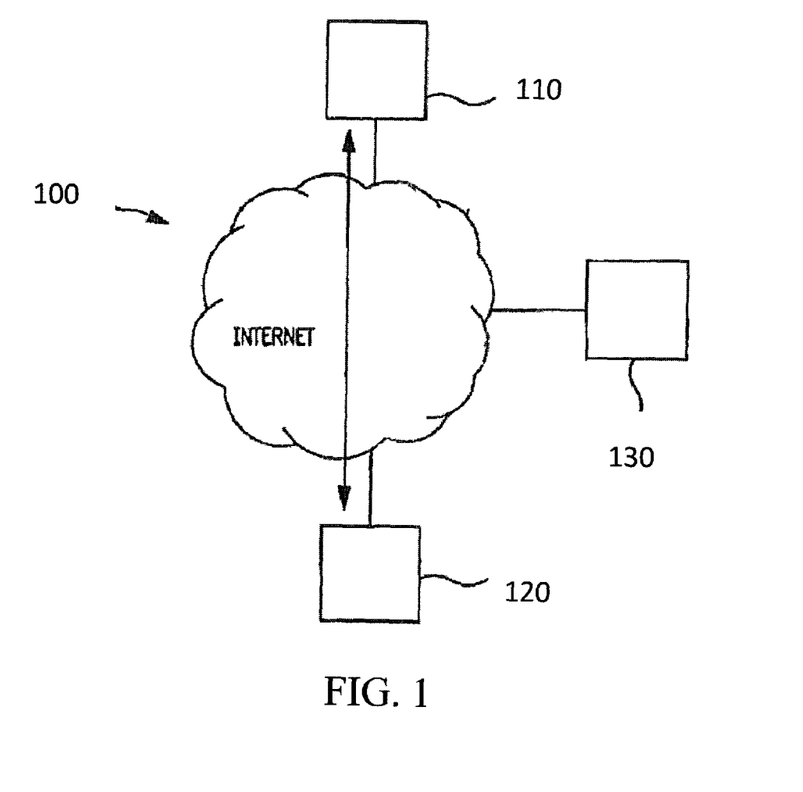
FIG. 1 is a demonstrative transaction system for providing variety of E-commerce, in accordance with an embodiment of the invention.

FIG. 1 is a demonstrative transaction system 100 for providing variety of E-commerce, in accordance with an embodiment of the invention. System 100 and the systems and processes explained below may constitute machine-executable instructions embodied within a machine (e.g., computer) readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

Transaction system 100 illustrated by FIG. 1 can include a first end 110 coupled to open distributed information network or Internet for conducting electronic transaction, a second end 120 coupled to Internet for verifying the electronic transaction and an time server 130 coupled to Internet for arbitrating the electronic transaction between the first end and the second end. The time server 130 does not contact both the first end 110 and the second end 120, and has no need to know anything from both the first and second end. Moreover, the first end 110 comprises a means that can generate a time capsule signature on a message for a committed time and a sampled witness value based on the committed time. The first end 110 further comprises a means that can generate a pre-hatched signature by combining or relating the time capsule signature and the sampled witness value. The second end 120 comprises a means that can validate the pre-hatched signature at a validated time before the committed time. In an exemplary embodiment, the first end 110 can be a credential releaser, and the second end can be a credential receiver. Furthermore, the first end can be a signer, and the second end can be a verifier.

Figure 2A:
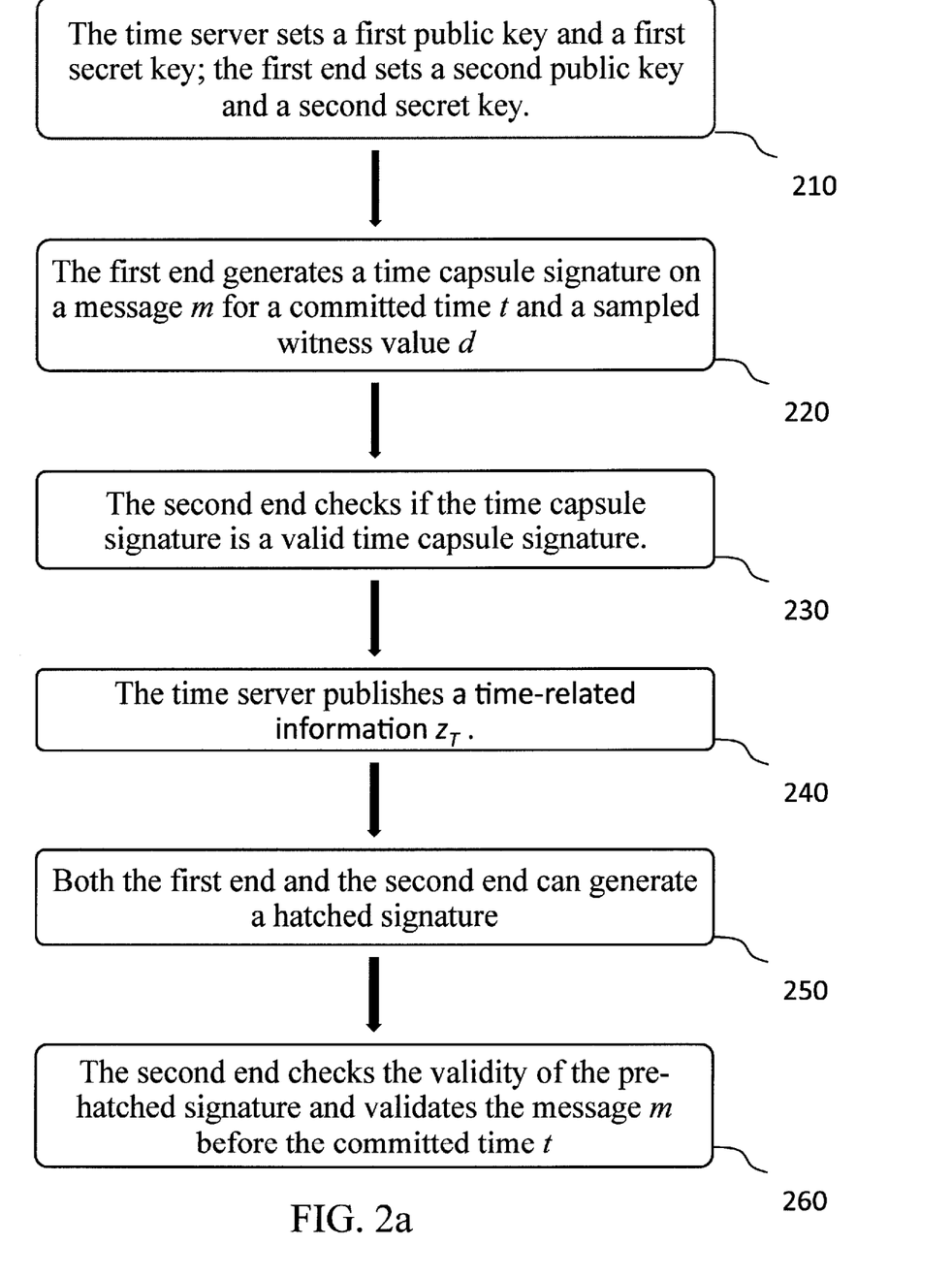
FIG. 2a illustrates a process for hatching the time capsule signature, in accordance with one of embodiments of the invention.
Figure 2B:
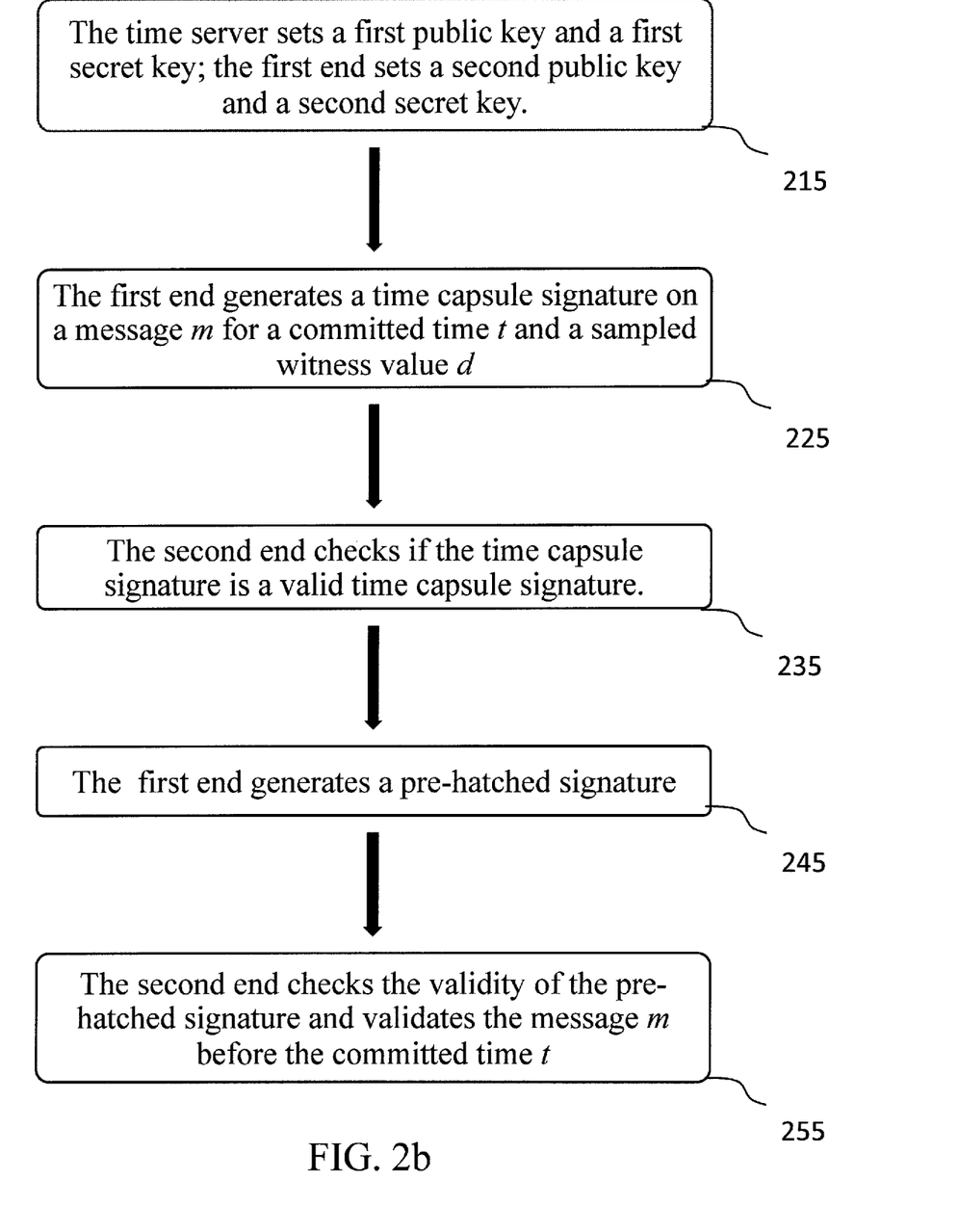
FIG. 2b illustrates a process for pre-hatching the time capsule signature, in accordance with one of embodiment of the invention.
Figure 3:
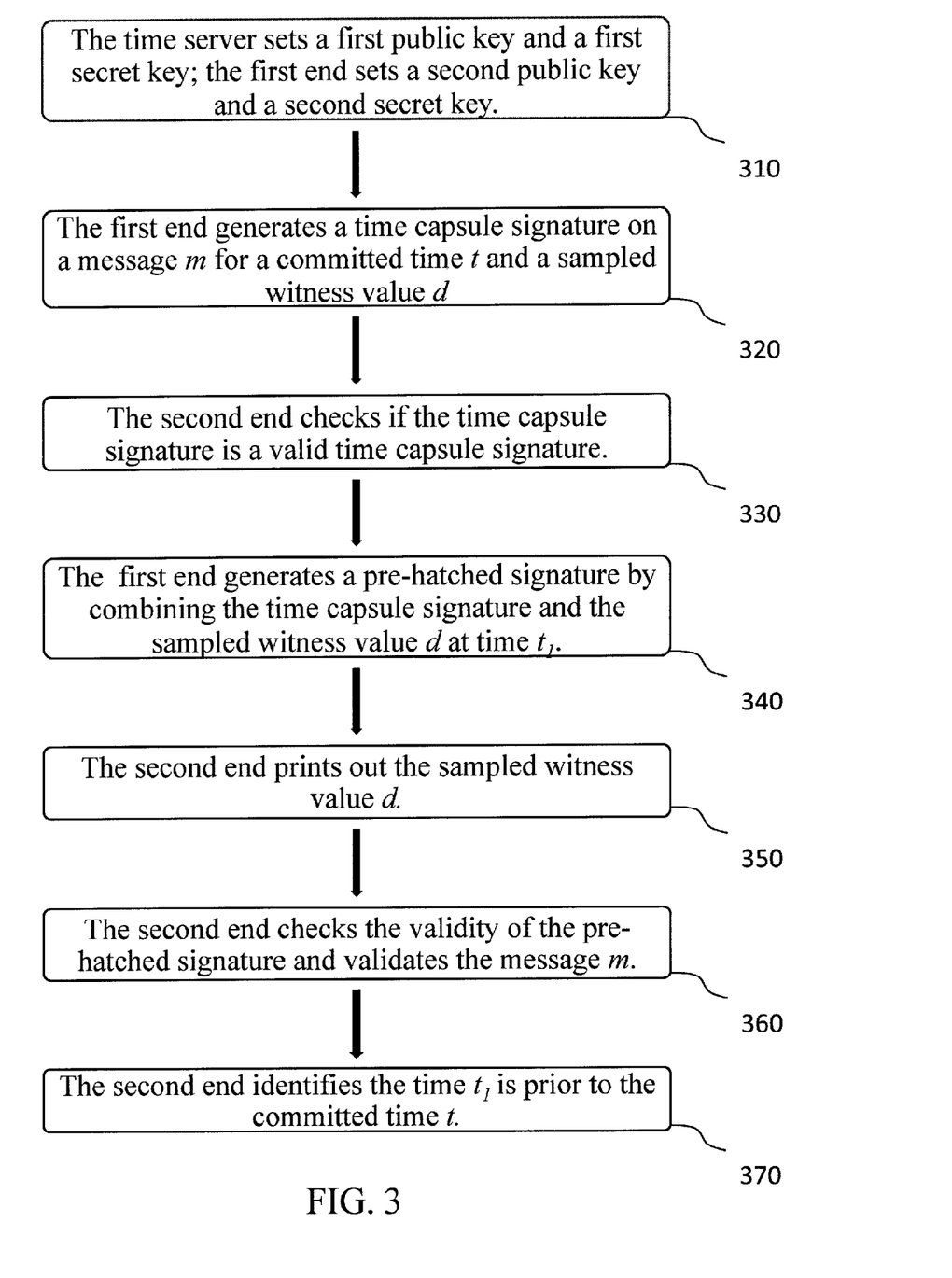
FIG. 3 illustrates a process for identifying the time when the time capsule signature is validated, in accordance with one of embodiment of the invention.

FIGS. 2 and 3 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 2a, FIG. 2a demonstrates an E-commerce transaction method for validating a time capsule signature at a committed time t, which comprises the following steps. At first, in Step 210, a first public key and a first secret key are set by the time server; meanwhile, a second public and a second public key are set by the first end. In Step 220, the first end generates the time capsule signature $\sigma'_t$ on a message m for the committed time t as well as a sampled witness value d based on the committed time t. The first end then stores the sampled witness value d. In Step 230, the second end checks if the time capsule signature $\sigma'_t$ is a valid time capsule signature. If the time capsule signature is not valid before the committed time t, the time server publishes a time-related information $z_T$ based on the committed time t and the first secret key, as indicated in Step 240. Step 250 shows that both the first end and the second end are able to generate a hatched signature by combining or relating the time capsule signature and an inverted witness value d. In Step 260, the second end checks the validity of the hatched signature and validates the message m at committed time t.

Referring now to FIG. 2b, FIG. 2b illustrates an E-commerce transaction method for permitting the first end to validate a time capsule signature before the committed time t. The exemplary transaction method comprises the following steps. In Step 215, the timer server sets a first public key and a first secret key; meanwhile, the first end sets a second public key and a second secret key. In Step 225, the first end generates the time capsule signature $\sigma'_t$ on a message m for the committed time t and a sampled witness value d based on the committed time t. The first end then stores the sampled witness value d. In Step 235, the second end checks if the time capsule signature $\sigma'_t$ is a valid time capsule signature. If the first end wants to validate the time capsule signature $\sigma'_t$ before the committed time t, the first end retrieves the sampled witness value d and generates a pre-hatched signature by combining or relating the time capsule signature and the sampled witness value d, as showed in Step 245. The second end, in Step 255, checks the validity of the pre-hatched signature and validates the message m before the committed time t.

Referring now to FIG. 3, FIG. 3 further illustrates an E-commerce transaction method for distinguishing a time capsule signature is pre-hatched or hatched. As discussed above, in some scenarios, there are demands to distinguish a pre-hatched signature from a hatched signature. In the case of debt repayment, as an example, if a borrower repays his debt before the committed date, he can improve his credit history or get extra reward. Then the signature for validating the payment check should be determined on whether it is pre-hatched or hatched. In this exemplary transaction method illustrated in FIG. 3, Steps 310 through 330 are the same as Steps 215 through 235 of FIG. 2(b). Further, in Step 340, if the first end would like to validate the signature before the committed time t, a pre-hatched signature is generated by combining or relating the time capsule signature and the sampled witness value d. In Step 350, the second end prints out the sampled witness value d before verifying the pre-hatched signature. The second end, in Step 360, checks the validity of the pre-hatched signature and validates the message m. There are two different algorithms are used to check the validity of the signature to be validated at this step. One is "used to verify the pre-hatched signature, and the other is used to verify the hatched signature. Accordingly, the second end can identify the time $t_1$ is prior to the committed time t, as shown in Step 370.

In one embodiment, a time capsule signature scheme can extended to achieve a property called Hiding. The Hiding property can capture a malicious time server who aims to forge a sampled for a given commitment.

Moreover, in the following embodiments the first public key is exemplarily replaced by a public time release key (tpk), and the first secret key is exemplarily replaced by a secret time release key (tsk). The second public key is exemplarily replaced by a user public key (upk), and the second secret key is exemplarily replaced by a user secret key (usk).

<Embodiment 1> Definition of Time Capsule Signature:

A time capsule signature scheme comprises eight PPT algorithms including: TSSetup, UserSetup, TSig, TVer, TRelease, Hatch, PreHatch and Ver. The definition of these eight algorithms are showed as follows:

1. TSSetup (Time Server Key Setup): On input $1^k$ where $k \in \mathbb{N}$ is a security parameter, it generates a public time release key (tpk) and a secret time release key (tsk).
2. UserSetup (User Key Setup): On input $1^k$, it generates a user public key (upk) and a secret key pair (usk).
3. TSig (Time Capsule Signature Generation): On input (m, $\sigma'_t$, usk, tpk, t), where t is a time value from which the signature will become valid. It outputs a time capsule signature $\sigma'_t$.
4. TVer (Time Capsule Signature Verification): On input (m, $\sigma'_t$, usk, upk, t) it returns 1 (accept) or 0 (reject). A time capsule signature $\sigma'_t$ is said to be valid if TVer returns 1 on it.
5. TRelease (Time Release): At the beginning of each time period T, $z_T \leftarrow$ TRelease(T, tsk) is published by the time server.
6. Hatch (Signature Hatch): On input (m, $\sigma'_t$, upk, tpk, $z_t$) both the first end and second end can run this algorithm to get a hatched signature $\sigma_t$ from a valid time capsule signature $\sigma'_t$.
7. PreHatch (Signature Prehatch): On input (m, $\sigma'_t$, usk, tpk, t), the signer can run the algorithm to get a prehatched signature $\sigma_t$ of a valid time capsule signature $\sigma'_t$ before time t. However, if $\sigma'_t$ is not valid, namely, TVer(m, $\sigma'_t$, upk, tpk, t)=0, then PreHatch should return $\bot$ which stands for unsuccessful pre-hatch.
8. Ver (Signature Verification): On input (m, $\sigma'_t$, usk, tpk, t), it returns 1 (accept) or 0 (reject).

<Embodiment 2> Adversarial Model:

There are three types of adversaries, $\mathcal{A}_I$, $\mathcal{A}_{II}$ and $\mathcal{A}_{III}$. $\mathcal{A}_I$ simulates a malicious signer whose aim is to produce a time capsule signature $\sigma'_t$, which looks good to a verifier, but cannot be hatched at time t. $\mathcal{A}_{II}$ simulates a malicious verifier who wants to hatch a time capsule signature before time t. $\mathcal{A}_{III}$ simulates a malicious time server who wants to forge a signature. Note that attacks launched by an outsider who wants to forge a signature can also be captured by $\mathcal{A}_{III}$. In the following, let $k \in \mathbb{N}$ be a security parameter.

Game I: Let $S_I$ be the game simulator.
1. $S_I$ executes TSSetup($1^k$) to get (tpk, tsk).
2. $S_I$ runs $\mathcal{A}_I$ on tpk. During the simulation, $\mathcal{A}_I$ can make queries onto TRelease.
3. $\mathcal{A}_I$ is to output (m*, t*, $\sigma'^*$, upk).
4. $S_I$ executes TRelease(t*, tsk) to get $Z^*_t$, and then executes Hatch(m*, $\sigma'^*$, upk, tpk, $z^*_t$) to get $\sigma^*$. $\mathcal{A}_I$ wins if TVer(m*, $\sigma'^*$, upk, tpk, t)=1 and Ver(m*, $\sigma^*$, upk, tpk, t)=0.

A time capsule signature scheme is secure in Game I if for every PPT algorithm $\mathcal{A}_I$, it is negligible for $\mathcal{A}_I$ to win the game. Note that there is no restriction put on the generation of user public key upk. This is natural as in practice, $\mathcal{A}_I$ is normally the one who generates (upk, usk).

Game II: Let $S_{II}$ be the game simulator.
1. $S_{II}$ executes TSSetup($1^k$) to get (tpk, tsk) and UserSetup ($1^k$) to get (upk, usk).
2. $S_{II}$ runs $\mathcal{A}_{II}$ on tpk and upk. During the simulation, $\mathcal{A}_{II}$ can make queries onto TSig, TRelease and PreHatch.
3. $\mathcal{A}_{II}$ is to output (m*, t*, $\sigma^*$).
4. $\mathcal{A}_{II}$ wins if Ver(m*, $\sigma^*$, upk, tpk, t*)=1 and $\mathcal{A}_{II}$ has never queried TRelease(t*) and PreHatch (m*, t*,·).

A time capsule signature scheme is secure in Game II if for every PPT algorithm $\mathcal{A}_{II}$, it is negligible for $\mathcal{A}_{II}$ to win the game.

Game III: Let $S_{III}$ be the game simulator.
1. $S_{III}$ executes TSSetup($1^k$) to get (tpk, tsk) and UserSetup($1^k$) to get (upk, usk).

2. $S_{III}$ runs $\mathcal{A}_{III}$ on tpk and tsk. During the simulation, $\mathcal{A}_{III}$ can make queries onto TSig, TRelease and Pre-Hatch.

3. $\mathcal{A}_{III}$ is to output (m*, t*, σ*).

$\mathcal{A}_{III}$ wins if Ver(m*, σ*, upk, tpk, t*)=1 and $\mathcal{A}_{III}$ has never queried TSig(m*,·) for time t*.

A time capsule signature scheme is secure in Game III if for every PPT algorithm $\mathcal{A}_{III}$, it is negligible for $\mathcal{A}_{II}$ to win the game.

<Embodiment 3> Identity-Based Trapdoor Relation (IDTR):

A binary relation R is a subset of $\{0,1\}^* \times \{0,1\}^*$ and the language $\pounds_R$ is the set of α's for which there exist β such that (α, β) ∈ R, i.e., $\pounds_R = \{\alpha | \exists \beta [(\alpha, \beta) \in R]\}$. It assumes that (1) there is an efficient algorithm to decide whether $\alpha \in \pounds_R$ or not, (2) if (α, β) ∈ R, then the length of β is polynomially bounded in |α| and (3) there exists a short description $D_R$ which specifies the relation R.

An identity-based trapdoor relation (IDTR) is a set of relations $\mathcal{R} = \{R_{id} | id \in I_{\mathcal{R}}\}$, where each relation $R_{id}$ is called a trapdoor relation and there is a master trapdoor $mtd_{\mathcal{R}}$ for extracting the trapdoor $td_{id}$ of each $R_{id}$. Formally, IDTR is specified by the following five probabilistic polynomial-time (PPT) algorithms (Gen, Sample, Extract, Invert, Check).

1. Gen: This algorithm is used to generate $\mathcal{R} = \{R_{id} | id \in I_{\mathcal{R}}\}$ where $I_{\mathcal{R}}$ is a finite set of indices. Gen($1^k$) returns $D_{\mathcal{R}}$ (the description of $\mathcal{R}$) and $mtd_{\mathcal{R}}$ (the master trapdoor).

2. Sample: This sampling algorithm takes ($D_{\mathcal{R}}$, id) as input and $\mathsf{Sample}_{D_{\mathcal{R}}}$(id) returns a random commitment c and a sampled witness d such that (c,d) ∈ $R_{id}$.

3. Extract: This algorithm is used to extract the trapdoor of each relation by using $mtd_{\mathcal{R}}$. $\mathsf{Extract}_{mtd_{\mathcal{R}}}$, (id) returns the trapdoor $td_{R_{id}}$ of relation $R_{id}$.

4. Invert: This algorithm is used to find a sampled witness d for a given $c \in \pounds_{R_{id}}$ by using the trapdoor $td_{R_{id}}$. If $c \in \pounds_{R_{id}}$, then $\mathsf{Invert}_{td_{Rid}}$(c) returns a witness $\hat{d}$ such that (c, $\hat{d}$) ∈ $R_{id}$).

5. Check: This algorithm is used to check the validity of a witness d on the commitment c. If (c,d) ∈ $R_{id}$, then $\mathsf{Check}_{D_{\mathcal{R}},id}$ (c, d) returns 1 (accept). Otherwise, it returns 0 (reject).

Properties: One-wayness requires that no one is able to find the witness of a commitment if the trapdoor information is not given. Soundness requires that no one can produce a commitment whose witness cannot be found using Invert.

One-wayness: Let $O_{Extract}$ be an oracle simulating the trapdoor extraction procedure Extract and Query(A, $O_{Extract}$) the set of queries an algorithm A asked to $O_{Extract}$. It states that the following probability is negligible for all PPT algorithm A=($A_1$, $A_2$):

$$Pr[\mathsf{Check}_{D_{\mathcal{R}},id^*}(c^*, \check{d}) = 1 \wedge id^* \notin \mathsf{Query}(A, O_{Extract}) |$$
$$(D_{\mathcal{R}}, mtd_{\mathcal{R}}) \leftarrow \mathsf{Gen}(1^k); (id^*, h) \leftarrow A_1^{O_{Extract}}(D_{\mathcal{R}});$$
$$(c^*, d) \leftarrow \mathsf{Sample}_{D_{\mathcal{R}}}(id^*); \check{d} \leftarrow A_2^{O_{Extract}}(id^*, c^*, h)]$$

Soundness: It is required that the following probability should be negligible for all algorithm B:

$$Pr[R_{id^*} \in \mathcal{R} \wedge c^* \in \pounds_{R_{id^*}} \wedge \mathsf{Check}_{D_{\mathcal{R}},id^*}(c^*, \check{d}) = 0 |$$

$$(D_{\mathcal{R}}, mtd_{\mathcal{R}}) \leftarrow \mathsf{Gen}(1^k); (c^*, id^*) \leftarrow B(D_{\mathcal{R}}, mtd_{\mathcal{R}});$$
$$td_{R_{id^*}} \leftarrow \mathsf{Extract}_{mtd_{\mathcal{R}}}(id^*); \check{d} \leftarrow \mathsf{Invert}_{td_{R_{id^*}}}(c^*)]$$

ID-THIR has an ambiguity property which requires that witness $\hat{d}$ inverted from c given $td_{R_{id}}$ is computationally indistinguishable from d obtained from $\mathsf{Sample}_{D_{\mathcal{R}}}$ (id) for the same commitment c.

<Embodiment 4> Implementations of IDTR in Random Oracle Model:

One concrete construction of IDTR is proposed based on Boneh-Franklin's IBE whose security has been proven in the random oracle model. An Identity-Based Encryption (IBE) scheme consists of four PPT algorithms including: Setup, KeyGen, Encrypt, Decrypt. The Boneh-Franklin scheme is described as follows:

1. Setup: Given a security parameter k ∈ $\mathbb{N}$, generate a prime q, two groups $\mathbb{G}_1, \mathbb{G}_2$ of order q, and an admissible bilinear map $\tilde{e}: \mathbb{G}_1 \times \mathbb{G}_1 \rightarrow \mathbb{G}_2$, where |q| is some polynomial in k. Choose a random generator P ∈ $\mathbb{G}_1$, pick a random s ∈ $\mathbb{Z}_q^*$ and set $P_{pub}$=sP. Choose a cryptographic hash function $H_1: \{0,1\}^* \rightarrow \mathbb{G}_1$, another hash function $H_2: \mathbb{G}_2 \rightarrow \{0,1\}^k$, and the security analysis will view $H_1$, $H_2$ as random oracles [4]. The message space is M=$\{0,1\}^k$. The ciphertext space is C= $\mathbb{G}_1 \times \{0,1\}^k$. The system public key is mpk=⟨q, $\mathbb{G}_1$, $\mathbb{G}_2, \tilde{e}$, P, $P_{pub}$, $H_1$, $H_2$⟩ The master secret key msk is s ∈ $\mathbb{Z}_q^*$.

2. KeyGen: For a given string id ∈ $\{0,1\}^*$ the algorithm computes $Q_{id}=H_1(id) \in \mathbb{G}_1$, and sets the private key $sk_{id}$ to be $sQ_{id}$ where s is the master secret key.

3. Encrypt: To encrypt m ∈ M under the public key id, the algorithm computes $Q_{id}=H_1(id) \in \mathbb{G}_1$, chooses a random r ∈ $\mathbb{Z}_q^*$, and sets the ciphertext to be c=⟨ rP,m⊕$H_2$($g_{id}^r$) ⟩ where $g_{id}=\tilde{e}(Q_{id}, P_{pub}) \in \mathbb{G}_2$.

4. Decrypt: Given the private key $sk_{id} \in \mathbb{G}_1$, a ciphertext c=⟨$c_1, c_2$⟩ ∈ C can be decrypted by computing $c_2 \oplus H_2(\tilde{e}(sk_{id}, c_1))$=m.

An IDTR based on the IBE above is constructed as follows:

1. Gen: Run Setup($1^k$), and set $\pounds_{\mathcal{R}}$=C, $D_{\mathcal{R}}$=mpk, and $mtd_{\mathcal{R}}$=msk.

2. Sample: Given $D_{\mathcal{R}}$ and id, randomly pick m ∈ M and compute c=$\mathsf{Encrypt}_{id}$(m). Let r ∈ $\mathbb{Z}_q^*$ be the randomness used in Encrypt. Set witness d=⟨ $rQ_{id}$, $P_{pub}$, m⟩.

3. Extract: Given a string id ∈ $\{0,1\}^*$, compute $sk_{id}$=$\mathsf{KenGen}_{mpk,msk}$(id), and set $td_{R_{id}}$=$sk_{id}$.

4. Invert: Given trapdoor $td_{R_{id}} \in \mathbb{G}_1$ and a commitment c= ⟨$c_1, c_2$⟩ ∈ C, compute m=$\mathsf{Decrypt}_{sk_{id}}$(c), and set the witness $\hat{d}$=⟨ $td_{R_{id}}$, $c_1$, m⟩.

5. Check: Given $D_{\mathcal{R}}$, id, c=⟨$c_1, c_2$⟩ ∈ C, d=⟨$d_1, d_2, d_3$⟩ (where $d_1, d_2 \in \mathbb{G}_1$, and $d_3$ ∈ M), if $d_2$=$P_{pub}$, $\hat{e}(d_1,P)$=$\hat{e}(c_1, Q_{id})$, and $c_2$=$d_3 \oplus H_2$ ($\hat{e}(d_1, d_2)$), return 1. Else if $d_1$=$td_{R_{id}}$, $d_2$=$c_1$, $\hat{e}(d_1, P)$=$\hat{e}(P_{pub}, Q_{id})$ and $c_2$=$d_3 \oplus H_2(\hat{e}(d_1, d_2))$, return 1. Otherwise, return 0.

In the game of one-wayness, an adversary A has access to the Extract oracle of all id other than id*. This oracle is simulated by performing KeyGen of the underlying IBE scheme. A wins if it can find secret key $sk_{id^*}$ and plaintext m*. However, the semantic security of the underlying IBE attains that any PPT adversary will have negligible advantage in distinguishing m* with another m in M. If A succeeds, it is easy to see that we can also distinguish m*, which contradicts the security of the underlying IBE scheme.

In the game of Soundness, an adversary B wins if it can generate a value c* which is not able to decrypt under $sk_{id*}$. In the underlying IBE scheme, this will not be the case even when B knows msk. Given id*, $sk_{id*}$ can always be properly generated with the knowledge of msk. As long as c* is in the ciphertext domain, a valid plaintext m* can always be retrieved.

<Embodiment 5> Implementations of IDTR in Standard Model:

Another concrete construction of IDTR is proposed based on Waters' IBE whose security has been proven in the standard model. An Identity-Based Encryption (IBE) scheme consists of four PPT algorithms including: Setup, KeyGen, Encrypt, Decrypt. The Waters scheme is described as follows:

1. Setup: Given a security parameter $k \in \mathbb{N}$, generate a prime p, two groups $\mathbb{G}_1, \mathbb{G}_2$ of order p, and an admissible bilinear map $\tilde{e}: \mathbb{G}_1 \times \mathbb{G}_1 \rightarrow \mathbb{G}_2$, where |p| is some polynomial in k. Choose a random generator $g \in \mathbb{G}_1$, pick a random $\alpha \in \mathbb{Z}_q^*$ and set $g_1 = g^\alpha$. Choose random values $g_2, u' \in \mathbb{G}_1$, and a random k-length vector $U=(u_i)$, whose elements are chosen uniformly at random from $\mathbb{G}_1$. The message space is $M \subseteq \mathbb{G}_2$. The ciphertext space is $C = \mathbb{G}_2 \times \mathbb{G}_1 \times \mathbb{G}_{11}$. The system public key is $mpk = \langle p, \mathbb{G}_{11}, \mathbb{G}_2, \tilde{e}, k, g, g_1, g_2, u', U \rangle$. The master secret key msk is $g_2^\alpha$.

2. KeyGen: Let v be an k-bit string representing an identity id, $v_i$ denote the ith bit of v, and $V \subseteq 1, \ldots, k$ be the set of all i for which $v_i = 1$. (V is the set of indices for which the bit-string v is set to 1.) Randomly select $r \in \mathbb{Z}_p^*$ and construct the private key $sk_{id}$ as:

$$sk_{id} = \left\langle g_2^\alpha \left(u' \prod_{i \in v} u_i\right)^r, g^r \right\rangle$$

3. Encrypt: To encrypt $m \in M$ for an identity v, randomly select $t \in \mathbb{Z}_p^*$ and construct the ciphertext c as:

$$c = \left\langle \tilde{e}(g_1, g_2)^t m, g^t, \left(u' \prod_{i \in v} u_i\right)^t \right\rangle$$

4. Decrypt: Given the private key $sk_{id} = \langle sk_1, sk_2 \rangle$, a ciphertext $c = \langle c_1, c_2, C_3 \rangle \in C$ can be decrypted by computing $$c_1 = \frac{\tilde{e}(sk_2, c_3)}{\tilde{e}(sk_1, c_2)}$$

$$= (\tilde{e}(g_1, g_2)^t m) \frac{\tilde{e}\left(g^r, \left(u' \prod_{i \in v} u_i\right)^t\right)}{\tilde{e}\left(g_2^\alpha, (u' \prod_{i \in v} u_i)^r, g^t\right)}$$

$$= (\tilde{e}(g_1, g_2)^t m) \frac{\tilde{e}\left(g, \left(u' \prod_{i \in v} u_i\right)^{rt}\right)}{(\tilde{e}(g_1, g_2)^t)\tilde{e}((u' \prod_{i \in v} u_i)^{rt}, g)}$$

$$= m$$

An IDTR based on Waters's IBE above is constructed as follows:

1. Gen: Given $k \in \mathbb{N}$, execute $(mpk, msk) \leftarrow Setup(1^k)$ and set $\pounds_R = C$, $D_R = mpk$, and $mtd_R = msk$.

2. Sample: Given $D_R$ and id, randomly pick $m \in \mathbb{G}_2$ and compute $c = Encrypt_{id}(m)$. Let $t \in \mathbb{Z}_p^*$ be the randomness in producing c. Set witness d to $$d = \left\langle g_2^t \left(u' \prod_{i \in v} u_i\right), g_2, c_3, m \right\rangle$$

3. Extract: Let v be an k-bit identity id, compute $sk_{id} = KenGen_{mpk;msk(id)}$ and set $td_{R_{id}} = sk_{id}$.

4. Invert: Given trapdoor $td_{R_{id}}$ and a commitment $c = \langle c_1, C_2, C_3 \rangle \in C$, compute $m = Decrypt_{sk_{id}}(c)$, and set the witness to $$\hat{d} = \langle sk_1, c_2, sk_2, c_3, m \rangle$$

5. Check: Given $D_R$, id, $c = \langle c_1, c_2, c_3 \rangle \in C$, $d = \langle d_1, d_2, d_3, d_4, d_5 \rangle$ (where $d_1, d_2, d_3, d_4 \in \mathbb{G}_{12}$, and $d_5 \in \mathcal{M}$), if $d_2 = g_1\left(u' \prod_{i \in v} u_i\right)$, $d_3 = g_2$, $d_4 = c_3$, $\tilde{e}\left(d_1, u' \prod_{i \in v} u_i\right) = \tilde{e}(d_1, c_3)$ and $c_1 = M \frac{\tilde{e}(d_1, d_2)}{\tilde{e}(d_3, d_4)}$, return 1

(**). Else if $d_1 = sk_1$, $d_2 = c_2$, $$d_3 = sk_{21}, d_4 = c_3, \tilde{e}(sk_1, g) = \tilde{e}(g_2, g_1) \cdot$$

$$\tilde{e}\left(u' \prod_{i \in v} u_i, sk_2\right), \text{ and } c_1 = M \frac{\tilde{e}(d_1, d_2)}{\tilde{e}(d_3, d_4)},$$

return 1. Otherwise, return 0.

(**): The check will pass because:

$$c_1 \frac{\tilde{e}(d_1, d_2)}{\tilde{e}(d_3, d_4)} = m \frac{\tilde{e}\left(g_2^t, g_1\left(u' \prod_{i \in v} u_i\right)\right)}{\tilde{e}\left(g_2, (u' \prod_{i \in v} u_i)^t\right)}$$

$$= m \frac{\tilde{e}(g_2^t, g_1) \cdot \tilde{e}\left(g_2^t, \left(u' \prod_{i \in v} u_i\right)\right)}{\tilde{e}\left(g_2, (u' \prod_{i \in v} u_i)^t\right)}$$

$$= m \cdot \tilde{e}(g_2^t, g_1)$$

$$= c_1$$

Similar to the first implementation, the proof of One-wayness can be reduced to semantic security of Waters' IBE scheme. Soundness also holds since a valid $c \in C$ can always be decrypted to a message m for a given $sk_{id}$.

<Embodiment 6> Generic Construction of Time Capsule Signature:

An example forward looking a time capsule signature scheme based on a new primitive, identity-based trapdoor relation (IDTR) as defined in the embodiment 3. Let (Set, Sig, Verify) be the key generation, signature generation and verification algorithms of an ordinary signature scheme, and (Gen, Sample, Extract, Invert, Check) be the tuples of IDTR.

1. TSSetup: Let $k \in \mathbb{N}$ be a security parameter. The Time Sever gets $(D_\mathcal{R}, mtd_\mathcal{R}) \leftarrow \text{Gen}(1^k)$ and sets public/secret time release key pair (tpk, tsk)=$(D_\mathcal{R}, mtd_\mathcal{R})$.
2. UserSetup: Each user runs (pk, sk)$\leftarrow$Set($1^k$) and sets (upk, usk)=(pk, sk).
3. TSig: To generate a time capsule signature on a message m for a future time t, the signer gets a commitment/witness pair (c, d)$\leftarrow$ $\text{Sample}_{D_\mathcal{R}}$(t), and then computes s$\leftarrow$Sig$_{usk}$(m ∥ c ∥ t). The time capsule signature $\sigma'_t$ is (s, c). The signer stores the sampled witness d.
4. TVer: A verifier checks if $\sigma'_t=$( s, c) is a valid time capsule signature by checking whether $c \in \pounds_{R_t}$ and s is a valid standard signature under public key upk, that is, check if Verify$_{upk}$ (m ∥ c ∥ t)=1. If both are correct, output 1; otherwise, output 0.
5. TRelease: At the beginning of each time period T, the Time Server gets td$_{R_T}\leftarrow$Extract$_{tsk}$ (T) and publishes td$_{R_T}$ as $Z_T$.
6. Hatch: To hatch a time capsule signature $\sigma'_t=$(s, c), a party computes $\tilde{d}\leftarrow$Invert$_{td_{R_t}}$(c). The hatched signature is $\sigma_t=$(s, c, $\tilde{d}$).
7. PreHatch: To prehatch a valid time capsule signature $\sigma'_t=$(s, c), the signer retrieves stored value d, and sets the prehatched signature to $\sigma_t=$(s, c, d). However, if Tver(m, $\sigma_t$, upk, tpk, t)=0, then the algorithm outputs ⊥.
8. Ver: For a given prehatched (or hatched) signature $\sigma_t=$(s, c, d), the verifier checks the validity of (c, d) by running Check$_{tpk,t}$(c, d). Then, it verifies s on m ∥ c ∥ t by running Verify$_{upk}$ ( m ∥ c ∥ t, s). If both verifications are correct, output 1; otherwise, output 0.

<Embodiment 7> Security Analysis:

The proposed time capsule signature scheme is secure if the underlying public key signature scheme is existentially unforgeable against adaptive chosen message attacks and the IDTR has the properties of one-wayness and soundness. The security of the proposed time capsule signature scheme against Game I, Game II and Game III is proven as below.

Security Against Game I: $\mathcal{A}_1$ wins the game if he can generate a valid time capsule signature $\sigma'_t=$(s, c) such that $c \in \pounds_{R_t}$, and Ver$_{upk}$(m ∥ c ∥ t, s)=1. Moreover, no party can obtain a witness $\tilde{d}=$Invert$_{td_{R_t}}$(c) such that Check$_{tpk,t}$(c, $\tilde{d}$)=1, where td$_{R_t}\leftarrow$Extract$_{tsk}$ (t) is released by the Time Server. This contradicts the Soundness property of IDTR. Thus, the proposed time capsule signature.

Security Against Game II: An adversary B is constructed, which breaks the One-wayness of IDTR with non-negligible advantage if $\mathcal{A}_{II}$ forges a valid signature $\sigma$. Let (m*, t*, $\sigma$*) be a successful forgery generated by $\mathcal{A}_{II}$. Since the underlying standard signature scheme (Set, Sig,Verify) is euf-cma, $\mathcal{A}_{II}$ has overwhelming probability to have obtained the corresponding time capsule signature $\sigma'$* from oracle TSig rather than forging $\sigma'$ on its own.

The game between the IDTR One-wayness challenger and adversary B starts when the challenger generates $D_\mathcal{R}$ and $mtd_\mathcal{R}$ by running Gen($1^k$). After receiving $D_\mathcal{R}$ from the challenger, B interacts with $\mathcal{A}_{II}$ in Game II as follows:

B gets a random public/private key pair (pk, sk)$\leftarrow$Set($1^k$), sets (upk, usk)=(pk, sk), tpk, =$D_\mathcal{R}$, and gives (tpk, upk) to $\mathcal{A}_{II}$.

B manages a list L={$(m_i, t_i, s_i, c_i, d_i)$} for answering $\mathcal{A}_{II}$'s queries on PreHatch. Let $q_{TSig}$ be the total number of TSig queries made by $\mathcal{A}_{II}$ and r be the random number chosen by B in the interval of [1, $q_{TSig}$]. B responds to the i-th TSig query $(m_i, t_i)$ as follows:

If i=r, B sends $t_r$ to the IDTR One-wayness challenger and receives a random commitment $c \in R_{t_r}$ from the challenger. B sets $c_r=$c and computes $s_r=$Sig$_{usk}$($m_r$ ∥ $c_r$ ∥ $t_r$). B returns $\sigma'_{t_r}=$($S_r$, $C_r$) to $\mathcal{A}_{II}$ and stores ($m_r$, $t_r$, $s_r$, $c_r$, ⊥) in the list L.

If i≠r, B gets a random commitment/witness pair ($c_i$, $d_i$) generated from $\text{Sample}_{D_\mathcal{R}}$ and computes $s_i=$Sig$_{usk}$($m_i$ ∥ $c_i$ ∥ $t_i$). B returns $\sigma'_{t_i}=$($s_i$, $c_i$) to $\mathcal{A}_{II}$ and stores ($m_i$, $t_i$, $s_i$, $c_i$, $d_i$) in L.

To simulate oracle TRelease, say on query $t_i$ from $\mathcal{A}_{II}$, B relays $t_i$ to the trapdoor extraction oracle Extract simulated by the IDTR One-wayness challenger and gets tdRti. If $t_i=t_r$, B aborts. Otherwise, B returns $z_{t_i}=$to$\mathcal{R}_{t_i}$ to $\mathcal{A}_{II}$.

To simulate oracle PreHatch, say on query ($m_i$, $t_i$, $s_i$, $c_i$), B checks whether the query is in the list L or not. If ($m_i$, $t_i$, $s_i$, $c_i$) is in the list L, and equal to ($m_r$, $t_r$, $s_r$, $c_r$), B aborts. If ($m_i$, $t_i$, $s_i$, $c_i$) is in the list L, and not equal to ($m_r$, $t_r$, $s_r$, $c_r$), B extracts $d_i$ from L and gives a prehatched signature $\sigma_{t_i}=$($s_i$, $c_i$, $d_i$) to $\mathcal{A}_{II}$. If ($m_i$, $t_i$, $s_i$, $c_i$) is not in L, since $\mathcal{A}_{II}$ does not know usk and this case implies that $s_i$ is not generated by B on $m_i$ ∥ $c_i$ ∥ $t_i$, due to the euf-cma assumption of the underlying standard signature, it is negligible to have $s_i$ be valid. Hence this case will happen with negligible chance. Therefore, for this case, B returns ⊥.

When $\mathcal{A}_{II}$ outputs the forgery (m*, t*, $\sigma$*) where $\sigma$*=(s*, C*, d*), B verifies whether the forgery passes the verification algorithm Ver, and (m*, t*, s*, c*)=($m_r$, $t_r$, $s_r$, $c_r$). If so, B outputs the witness d*. Otherwise, it chooses a $d_B$ randomly and outputs $d_B$. The probability that B does not abort during the simulation and has a right guess of r is at least 1/$q_{TSig}$ since r is randomly chosen. Therefore, if $\mathcal{A}_{II}$ forges with a probability $\epsilon$, B succeeds in breaking the One-wayness of IDTR with probability $\epsilon$≥$\epsilon$/$q_{TSig}$.

Security Against Game III: To show the security against Game III, we convert any adversary $\mathcal{A}_{III}$, which wins in Game III to a forger F against the underlying standard signature scheme. F gets pk as an input, and has access to signing oracle Sig of the signature scheme as described in the euf-cma model [16]. F simulates Game III for $\mathcal{A}_{III}$ as follows:

F gets $(D_\mathcal{R}, mtd_\mathcal{R}) \leftarrow \text{Gen}(1^k)$ and gives (upk, tpk, tsk)= (pk, $D_\mathcal{R}, mtd_\mathcal{R}$) to $\mathcal{A}_{III}$. F simulates TSig on query ($m_i$, $t_i$) by getting ($c_i$, $d_i$)$\leftarrow$ $\text{Sample}_{D_\mathcal{R}}$($t_i$) and obtaining $s_i\leftarrow$Sig ($m_i$ ∥ $c_i$ ∥ $t_i$) from signing oracle Sig. F stores ($m_i$, $c_i$, $d_i$, $t_i$) in a list L={($m_i$, $c_i$, $d_i$, $t_i$)} for answering $\mathcal{A}_{III}$'s queries to PreHatch. To simulate PreHatch on query ($m_i$, $t_i$, $s_i$, $c_i$), F verifies if $s_i$ is a valid signature on $m_i$ ∥ c ∥ $t_i$.

If $s_i$ is valid, F checks if ($m_i$,$c_i$,$t_i$) is in the list L. If so, F gives the corresponding $d_i$ to $\mathcal{A}_{III}$. Otherwise, $s_i$ is a new signature value and F succeeds in producing a new forgery $s_i$ on $m_i$ ∥ $c_i$ ∥ $t_i$.

If $s_i$ is not valid, F returns ⊥ due to the same reason as shown above in the Security Against Game II.

Finally, when $\mathcal{A}_{III}$ outputs a forgery (m*, t*, $\sigma_t$*) where $\sigma_t$*=(s*, c*, d*), F outputs a signature s* on message m* ∥ c* ∥ t*. Therefore, if $\mathcal{A}_{III}$ succeeds with a probability $\epsilon$, F succeeds in producing a new forgery with at least probability $\epsilon$.

<Embodiment 8> Extended IDTR:

Ahe extended IDTR has seven PPT algorithms including: Gen, Sample, Reveal, Extract, Invert, CheckS and CheckI. The settings of Gen, Sample, Extract and Invert remain the same as in IDTR. Reveal is used to print out a "sampled" witness. Check in IDTR is replaced by two separated functions: CheckS and CheckI, which are used to check the validity of the sampled witness value d and inverted witness value d̂, respectively. The definition of these newly added algorithms (Reveal, CheckS and CheckI) are showed as follows:

Reveal: Given $c \in \pounds_{R_{id}}$, if there is a pair (c, d) in a sampling list defined by List={(c, d, id)} where (c, d)← $\mathsf{Sample}_{D_R}$(id), Reveal$_{id}$(c) returns witness d. Otherwise, it returns ⊥.

CheckS: For any (c, d)← $\mathsf{Sample}_{D_R}$(id), we have Check$_{D_R,id}$(c, d) return 1 (accept); otherwise, it returns 0 (reject).

CheckI: Given (c,d̂) ∈ $R_{id}$, where d̂← $\mathsf{Invert}_{td_{R_{id}}}$(c), Check$_{D_R,id}$(c,d̂) returns 1 (accept). Otherwise, it returns 0 (reject).

With this modification, the extended IDTR can be used to achieve another property called Hiding, which is beyond One-wayness and Soundness. Hiding captures a malicious system master (e.g. a malicious Time Server) who aims to forge a sampled witness for a given commitment.

Hiding: Let $O_{sample}$ and $O_{Reveal}$ be oracles simulating the procedures of Sample and Reveal, respectively, where $O_{sample}$ only returns a commitment for each query. Let Query(A, $O_X$) be the set of queries an algorithm A asked to $O_X$, where X can be Sample or Reveal. Note that A can only obtain commitment c from $O_{sample}$. It states that the following probability is negligible for all PPT algorithm A:

$$Pr[Check_{D_R,id^*}(c^*, d^*) =$$
$$1 \wedge c^* \in Query(A, O_{sample}) \wedge c^* \notin Query(A, O_{Reveal}) |$$
$$(D_R, mtd_R) \leftarrow Gen(1^k); (c^*, d^*, id^*) \leftarrow A^{O_{sample}O_{Reveal}}(D_R, mtd_R)]$$

<Embodiment 9> A Generic construction of Extended IDTR:

Let ε be an IBE scheme. Let ε.Enc(mpk, id, m; r) be ε's encryption algorithm which encrypts message m under identity id and master public key mpk using randomness r. We say that ε is injective if it satisfies the following condition:

Injective: For every master public key mpk and every identity id, for every ciphertext e of a message m under mpk and id, there exists at most one randomness r such that e=ε.Enc(mpk,id,m;r).

In the literature, many IBE schemes are injective, like BasicIdent and FullIdent proposed by Boneh and Franklin, and Waters' IBE.

Suppose ε=(Setup, Extract, Enc, Dec) is an injective encryption scheme with IND-ID-CPA security, MSP is the message space, and RSP is the space of randomness used in ε.Enc. Let f:$\{0,1\}^{l(k)}$→RSP be a one-way function (or a hash function). We now give a generic construction of extended IDTR as follows.

Gen: On input $1^k$, run ε.Setup ($1^k$) to generate a master key pair (mpk, msk) and set $D_R$ =mpk and $mtd_R$ =msk.

Sample: On input $D_R$ and id, randomly select m ∈ MSP and s ∈ $\{0,1\}^{l(k)}$, compute r=f(s), and run ε. Enc ($D_R$, id, m; r) to generate a ciphertext e of m under the identity id. Store (id, c, d)=(id, (e), (m, s)) into a sampling list List and return (c, d).

Extract: Given $mtd_R$ and id, run ε.Extract($mtd_R$, id) to generate the corresponding private key $sk_{id}$ with respect to the identity id, and return $td_{R_{id}}$ =$sk_{id}$.

Invert: Given $td_{R_{id}}$ and c, run ε.Dec($D_R$, $td_{R_{id}}$, c) to get the plaintext m, and return d̂=($td_{R_{id}}$,m).

Reveal: Given c ∈ $\pounds_{R_{id}}$, check if there is an entry for c in the sampling list List={(id, c, d)}. If so, return the corresponding d; otherwise return ⊥.

CheckS: For any pair (c, d) output by algorithm Sample on input $D_R$ and id, we have that (c,d)=((e),(m,s)). Check if ε.Enc($D_R$,id,m;f(s))=e. If so, return 1 (accept); otherwise return 0 (reject).

CheckI: For any (c,d̂) ∈ $R_{id}$, where d̂← $\mathsf{Invert}_{td_{R_{id}}}$ (c), we have that (c,d̂)=((e),($sk_{id}$,m)). Check if m=ε.Dec($D_R$, $sk_{id}$,e). If so, return 1 (accept); otherwise, return 0 (reject).

The above scheme is a secure extended IDTR scheme, provided that the underlying IBE scheme ε is IND-ID-CPA secure, and function f is one-way. For the sake of completeness of underlying ID-based Encryption schemes, we provide all the proofs of One-wayness, Soundness and Hiding here.

One-wayness: If the above scheme is not one-way, namely, there is a PPT algorithm $\mathcal{A}=(\mathcal{A}_1, \mathcal{A}_2)$ which breaks the one-wayness property with non-negligible probability ε, we then construct a PPT algorithm B to break the IND-ID-CPA-security of the underlying encryption scheme ε with non-negligible probability as well.

After obtaining system parameters and master public key mpk from its challenger, B sets $D_R$ =mpk and runs $\mathcal{A}$ on input DR. To answer $\mathcal{A}_1$'s Extract query on id, B forwards this query to its own Extract oracle, and forwards the answer skid as $td_{R_{id}}$ back to $\mathcal{A}$. After $\mathcal{A}_1$'s Extract query phase is over, B randomly selects an id* which was not queried by $\mathcal{A}_1$, along with two random messages $m_0$, $m_1 \in$ MSP. It sends id*, $m_0$, $m_1$ to its own challenger. After receiving a ciphertext e* of either $m_0$ or $m_1$, B sets c=(e*), and feeds (id*, c) to $\mathcal{A}_2$. Again, B needs answer $\mathcal{A}_2$'s Extract queries. It acts the same as in answering $\mathcal{A}_1$'s Extract queries with the only exception that if the query input id is equal to id*, B aborts the simulation and outputs a random bit.

Finally, $\mathcal{A}_2$ outputs a d̂=(d̂$_1$, d̂$_2$). Then B computes $b_0$= CheckI$_{D_R,id^*}$ (c, d̂) and $b_0$=CheckS$_{D_R,id^*}$ (c, d̂). If $b_0$=1, B could easily get the corresponding private key $sk_{id^*}$ of identity id* as well as the plaintext m' of e*, such that m'=ε.Dec(mpk, $sk_{id^*}$, e*). It's guaranteed by the correctness of ε that m' must be either $m_0$ or $m_1$. Thus, B can output the right bit b. Otherwise, if $b_1$=1, we have that e*=ε.Enc(mpk, id*, d̂$_1$;f(d̂$_2$)). Again, guaranteed by the correctness of ε, d̂$_1$, is either $m_0$ or $m_1$. Thus B can know a bit b such that $m_b$=d̂$_1$. It outputs b and wins in the IND-ID-CPA game. If both $b_0$ and $b_1$ are 0, B simply flips a coin, and outputs the outcome. Obliviously, if $\mathcal{A}$ succeeds, B also succeeds. Therefore, the probability that B wins in the IND-ID-CPA game is at least $$\epsilon + \frac{1}{2}(1-\epsilon) = \frac{1}{2} + \frac{1}{2}\epsilon,$$

which is non-negligibly greater than one-half.

Soundness: The soundness is guaranteed by the correctness of the underlying encryption scheme ε. That is, for any valid ciphertext e with respect to any identity id, the owner of the corresponding private key $sk_{id}$ can always decrypt e to the original message m.

Hiding: If the above scheme is not hiding, that is, there is a PPT algorithm $\mathcal{A}$ which can break the hiding property with non-negligible probability $\epsilon$, then we can construct another PPT algorithm B to break the one-wayness of function $f$ with non-negligible probability as well.

On input $y=f(x)$ for some string $x \in \{0,1\}^{l(k)}$, B runs $\mathcal{A}$ as a subroutine. Suppose that $\mathcal{A}$ issues at most $q_S$ queries to $O_{Sample}$ and at most $q_R$ queries to $O_{Reveal}$. Implicitly, we have that $q_S > q_R$. B randomly chooses $i \in \{1, 2, \ldots, q_S\}$, and then simulates oracles $O_{Extract}$ and $O_{Reveal}$ for $\mathcal{A}$ as follows:

$O_{Sample}$: Suppose that this is the j-th query. On input $id_j$, B randomly selects $m \in MSP$. If $j=i$, B sets $r=y$ and $d=(m, \perp)$; otherwise, B randomly selects $S \in \{0,1\}^{l(k)}$, computes $r=f(s)$ and set $d=(m,s)$. It computes $e \leftarrow \epsilon.Enc(D_\mathcal{R}, id_j, m; r)$ and sets $c=(e)$. B stores $(id_j, c, d)$ into a sampling list List, and returns c. Note that in this way B perfectly simulates $O_{sample}$'s answers.

$O_{Reveal}$: On input id and $c=(e)$, B searches its sampling list List for an entry for $(id, c)$. If there is no List or no such an entry $(id, c, d=(d_1, d_2))$, B returns $\perp$; otherwise, if $d_2 = \perp$, B aborts; otherwise, it returns d.

Finally, $\mathcal{A}$ outputs $(id^*, (c^*, d^*))$ where $d^*=(d_1^*, d_2^*)$. If $\mathcal{A}$ wins in the Hiding game, we have $c^* \in Query(\mathcal{A}, O_{Sample})$, $c^* \notin Query(\mathcal{A}, O_{Reveal})$ and $Check_{D_\mathcal{R}, id^*}(c^*, d^*)=1$. It implies that $c^*=\epsilon.Enc(D_\mathcal{R}, id^*, d_1^*, f(d_2^*))$. If B's guess is correct, namely, $c^*$ is returned in the answer to the i-th Sample query, then by the injective property of E, we have that $f(d_2^*)=y$. Thus, $d_2^*$ is a pre-image of y. The probability that B succeeds in guessing i is at least $1/q_s$. If $\mathcal{A}$ breaks the Hiding property with probability $\epsilon$, then B breaks the one-wayness of $f$ with probability at least $\epsilon/q_s$, which is non-negligible. This is a contradiction to the one-wayness of $f$.

<Embodiment 10> Extended Time Capsule Signature:

Based on the extended IDTR, the Ver function in time capsule signature can also be separated into two functions accordingly: VerP is to verify the prehatched signature, and VerH is to verify the hatched signature. The generic construction of time capsule signature based on IDTR can then be modified as follows:

VerP: For a given prehatched signature $\sigma_t=(s, c, d)$ on m, a verifier checks if $CheckS_{tpk,t}(c, d)$ outputs 1 and $Verify_{upk}(m\|c\|t, s)$ outputs 1. If both of the verifications are correct, output 1; otherwise, output 0.

VerH: For a given hatched signature $\sigma_t=(s, c, \hat{d})$ on m, the verifier compares the current time with t. If the current time is smaller than t, it returns $\perp$ indicating that hatching cannot be done at the moment. Otherwise, the verifier determines if $CheckI_{tpk,t}(c, \hat{d})$ outputs 1 and $Verify_{upk}(m\|c\|t, s)$ outputs 1. If both of the verifications are correct, output 1; otherwise, output 0.

The Time Server should be fully trusted and it is assumed that the Time Server would not collude with any malicious user and release some time trapdoor $z_t$ before t. Otherwise, there is no way to distinguish whether a signature is prehatched by the actual signer or hatched by a malicious Time Server. In the distinguishable time capsule signature, the act of a malicious Time Server is distinguishable. Below is the formal security model. Let $k \in \mathbb{N}$ be a security parameter.

Game IV: Let $S_{IV}$ be the game simulator.
1. $S_{IV}$ executes $TSSetup(1^k)$ to get (tpk, tsk) and $UserSetup(1^k)$ to get (upk, usk).
2. $S_{IV}$ runs $\mathcal{A}_{IV}$ on upk, tpk and tsk. During the simulation, $\mathcal{A}_{IV}$ can make queries onto TSig, and PreHatch.
3. $\mathcal{A}_{IV}$ is to output $(m^*, t^*, \sigma^*)$.

$\mathcal{A}_{IV}$ wins if $VerP(m^*, \sigma^*, upk, tpk, t^*)=1$, and $\mathcal{A}_{IV}$ has never queried $PreHatch(m^*, t^*, \cdot)$.

A time capsule signature scheme is secure in Game IV if for all PPT algorithm $\mathcal{A}_{IV}$, it is negligible for $\mathcal{A}_{IV}$ to win the game. Now the security of our proposed time capsule signature scheme against Game IV is proven.

The extended time capsule signature scheme is secure in Game IV if the underlying extended IDTR scheme has the Hiding property, and the standard signature scheme is existentially unforgeable against adaptive chosen message attacks.

To show security against Game IV, we construct an adversary B which can compromise Hiding of the extended TDTR with non-negligible advantage if $\mathcal{A}_{IV}$ can non-negligibly forge a prehatched signature $\sigma^*$. Let $(m^*, t^*, \sigma^*)$ be a successful forgery by $\mathcal{A}_{IV}$, where $\sigma^*=(s^*, c^*, d^*)$. Note that it has overwhelming probability that $\mathcal{A}_{IV}$ obtained the corresponding time capsule signature $\sigma'^*$ from oracle TSig. This is because of the euf-cma assumption of the underlying standard signature scheme.

The game between the challenger of the extended IDTR Hiding game and adversary B starts when the challenger generates $D_\mathcal{R}$ and $mtd_\mathcal{R}$ by running $Gen(1^k)$, and then gives $D_\mathcal{R}$ and $mtd_\mathcal{R}$ to B. B then interacts with $\mathcal{A}_{IV}$ as follows:

B gets a random public/private key pair $(pk, sk) \leftarrow (Set(1^k)$, sets $(upk, usk)=(pk, sk)$, $(tpk, tsk)=(D_\mathcal{R}, mtd_\mathcal{R})$, and gives (tpk, tsk, upk) to $\mathcal{A}_{IV}$.

B manages a list $L=\{(m_i, t_i, s_i, c_i, d_i)\}$ for answering $\mathcal{A}_{IV}$'s queries to PreHatch. Let $q_{TSig}$ and $q_{PreH}$ be the total number of TSig and PreHatch queries made by $\mathcal{A}_{IV}$, respectively, and r be the random number chosen by B in the interval of $[1, q_{TSig}]$. B responds to the i-th TSig query $(m_i, t_i)$ as follows:

If $i=r$, B queries to its challenger on the Sample oracle on $t_r$ and receives a random commitment $c \in R_{t_r}$. B sets $c_r=c$ and computes $s_r=Sign_{sk}(m_i \| c_i \| t_i)$. B returns $\sigma'_{t_r}=(s_r, c_r)$ to $\mathcal{A}_{IV}$ and stores $(m_r, t_r, s_r, c_r, \perp)$ in L.

If $i \neq r$, B gets a random commitment/witness pair $(c_i, d_i) \leftarrow Sample_{D_\mathcal{R}}$ and $s_i \leftarrow Sign_{D_\mathcal{R}}(m_i \| c_i \| t_i)$. B returns $\sigma'_{t_i}=(s_i, c_i)$ to $\mathcal{A}_{IV}$ and stores $(m_i, t_i, s_i, c_i, d_i)$ in L.

To simulate PreHatch on query $(m_i, t_i, s_i, c_i)$, B checks if the query is in the list L. If $(m_i, t_i, s_i, c_i)$ is L, and equal to $(m_r, t_r, s_r, c_r)$, B aborts. If $(m_i, t_i, s_i, c_i)$ is in L, and not equal to $(m_r, t_r, s_r, c_r)$, B obtains $d_i$ from L and gives a prehatched signature $\sigma_{t_i}=(s_i, c_i, d_i)$ to $\mathcal{A}_{IV}$. If $(m_i, t_i, s_i, c_i)$ is not in L, since $\mathcal{A}_{IV}$ does not know usk and this case implies that $s_i$ is not generated by B on $m_i \| c_i \| t_i$, due to the euf-cma assumption of the underlying standard signature scheme, it is negligible to have $s_i$ be valid. Hence this case will happen with negligible chance. For this case, B returns $\perp$.

When $\mathcal{A}_{IV}$ outputs the forgery $(m^*, t^*, \sigma^*)$ where $\sigma^*=(s^*, c^*, d^*)$, B determines if the forgery passes CheckS, and $(m^*, t^*, s^*, c^*)=(m_r, t_r, s_r, c_r)$. If so, B outputs $d_i$. Otherwise, it chooses a value d randomly and outputs d. The probability that B does not abort during the simulation and has the right guess of r is at least $1=qTSig$ since r is randomly chosen (*). Therefore, if $\mathcal{A}_{IV}$ forges with success probability at least $\epsilon$, B succeeds in breaking the Hiding property of the extended IDTR with probability at least $\epsilon/q_{TSig}$.

(*) Without loss of generality, we assume that each TSig query is distinct and each PreHatch is also distinct, and $q_{PerH} \leq q_{TSig}$. The probability that $\mathcal{A}_{IV}$ outputs a forgery $(m^*, t^*, s^*, c^*)$ which passes CheckS but not in the list L is negligible due to the euf-cma assumption of the underlying standard signature scheme. B does not abort when answering the first PreHatch query is at least $(1-1/q_{TSig})$. It does not abort when answering the second PreHatch query is at least $(1-1/q_{TSig}) \times (1-1/(q_{TSig}-1))$. Finally we get $$Pr[\mathcal{B} \text{ does not abort}] \geq$$

$$\left(1 - \frac{1}{q_{TSig}}\right) \times \left(1 - \frac{1}{q_{TSig}-1}\right) \times \ldots \times \left(1 - \frac{1}{q_{TSig} - g_{PerH} + 1}\right) =$$

$$\frac{q_{TSig}-1}{q_{TSig}} \times \frac{q_{TSig}-2}{q_{TSig}-1} \times \ldots \times \frac{q_{TSig} - q_{PerH}}{q_{TSig} - q_{PerH} + 1} = \frac{q_{TSig} - q_{PerH}}{q_{TSig}}$$

And B makes the right guess of r in the remaining $q_{TSig}-q_{PerH}$ tuples is $1/(q_{TSig}-q_{PerH})$. Thus, the probability that B does not abort during the simulation and makes the right guess of r is at least $1/q_{TSig}$.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines) can be employed in connection with performing automatic and/or inferred action in connection with the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for validation in an e-commerce transaction, comprising:

receiving, by a second device comprising a processor and a memory from a first device comprising another processor and another memory over a network, a time capsule signature for an e-commerce transaction message for a committed time and a sampled witness value based on the committed time generated by the first device, wherein the committed time is based on a trusted time server arbitrating the e-commerce transaction between the first device and the second device;

receiving, by the second device from the first device over the network, a pre-hatched signature for the e-commerce transaction message based upon the time capsule signature and the sampled witness value generated by the first device using a first algorithm; and validating, by the second device, the e-commerce transaction message using the pre-hatched signature before the committed time, comprising:

generating, by the second device, a hatched signature for the e-commerce transaction message based on the time capsule signature and the sampled witness value using a second algorithm, wherein the pre-hatched signature and the hatched signature are distinguishable from each other; and identifying, by the second device, that a time of validating the e-commerce transaction message using the pre-hatched signature is prior to the committed time based on the prehatched signature and the hatched signature being distinguishable from each other.

2. The method of claim 1, further comprising: setting, at the trusted time server, a first public key and a first secret key based on a security parameter; and setting, at the first device, a second public key and second secret key based on the security parameter.

3. The method of claim 2, wherein the first public key comprises a description of a trapdoor relation, and the first secret key comprises a master trapdoor for extracting a trapdoor of the trapdoor relation.

4. The method of claim 2, wherein the security parameter is determined by a binary length of key material.

5. A method for validation in an e-commerce transaction, comprising:

generating, by a first device comprising a processor, a time capsule signature on an e-commerce transaction message for a committed time and a sampled witness value based on the committed time, wherein the sampled witness value is stored in a memory of the first device and the first device does not require information from other devices to access the sampled witness value transmitting, by the first device, over a network to a second device comprising another processor and another memory, the time capsule signature for the e-commerce transaction message for the committed time and the sampled witness value based on the committed time generated by the first device, wherein the committed time is based on a trusted time server arbitrating the e-commerce transaction between the first device and the second device;

generating, by the first device, a pre-hatched signature transmitted over the network to the second device for the e-commerce transaction message by relating the time capsule signature and the sampled witness value, wherein the pre-hatched signature and a hatched signature for the e-commerce transaction message based on the time capsule signature and the sampled witness value are distinguishable from each other, and wherein a time of validating the e-commerce transaction message using the pre-hatched signature prior to the committed time is identifiable based on the pre-hatched signature and the hatched signature being distinguishable from each other;

transmitting, by the first device, over the network to the second device the pre-hatched signature.

6. A method for validation in an e-commerce transaction, comprising:

validating, by a second device comprising a processor and a memory, an e-commerce transaction message using a pre-hatched signature generated at a first device comprising another processor and another memory based on a time capsule signature and a sampled witness value, wherein the pre-hatched signature is validated before a committed time, and the first device is coupled to the second device via network over which the e-commerce transaction message and pre-hatched signature are communicated from the first device, wherein the committed time is based on a trusted time server arbitrating the e-commerce transaction between the first device and the second device;

wherein the validating comprises:

generating, by the second device, a hatched signature based on the time capsule signature and the sampled witness value generated at the first device, wherein the pre-hatched signature and the hatched signature are distinguishable from each other; and identifying, by the second device, that a time of validating the message using the pre-hatched signature is prior to the committed time based on the prehatched signature and the hatched signature being distinguishable from each other.

7. The method of claim 6, further comprising receiving, by the second device, the sample witness value.

8. The method of claim 7, further comprising checking, by the second device, the sample witness value using a first function.

9. The method of claim 8, further comprising, receiving, by the second device, the inverted witness value.

10. The method of claim 9, further comprising checking, by the second device, the inverted witness value using a second function.

11. The method of claim 2, wherein the first public key is a public time release key, the first secret key is a secret time release key, the second public key is a user public key, and the second secret key is a user secret key.

12. The method of claim 3, further comprising generating, by the first device, an inverted witness value based on the description of the trapdoor relation and the committed time.

13. The method of claim 12, further comprising checking, by the second device, the sample witness value using a first function.

14. The method of claim 13, further comprising checking, by the second device, the inverted witness value using a second function.

15. The method of claim 5, further comprising: setting, at the trusted time server, a first public key and a first secret key based on a security parameter; and setting, by the first device, a second public key and second secret key based on the security parameter.

16. The method of claim 15, wherein the first public key comprises a description of a trapdoor relation, and the first secret key comprises a master trapdoor for extraction of a trapdoor of the trapdoor relation.

17. The method of claim 16, further comprising generating, by the first device, an inverted witness value based on the description of the trapdoor relation and the committed time.

18. The method of claim 17, further comprising transmitting, by the first device, the sample witness value to the second device.

19. The method of claim 18, further comprising, transmitting, by the first device, the inverted witness value to the second device.

20. The method of claim 15, wherein the security parameter is determined by a binary length of key material.

* * * * *